(12) United States Patent
Nrusimhan N.V. et al.

(10) Patent No.: US 8,774,946 B2
(45) Date of Patent: Jul. 8, 2014

(54) METHOD AND SYSTEM FOR ACCURATELY DETERMINING SERVICE PROVIDER ASSETS

(75) Inventors: Lakshmi Nrusimhan N.V., Tamil Nadu (IN); Priyanka G. Sriraghavan, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 690 days.

(21) Appl. No.: 12/648,856

(22) Filed: Dec. 29, 2009

(65) Prior Publication Data

US 2011/0161123 A1 Jun. 30, 2011

(51) Int. Cl.
| | |
|---|---|
| G05B 11/01 | (2006.01) |
| H04L 12/24 | (2006.01) |
| H04L 25/06 | (2006.01) |
| G06Q 10/06 | (2012.01) |
| H04W 24/10 | (2009.01) |
| G06F 17/30 | (2006.01) |

(52) U.S. Cl.
CPC ............ *H04L 41/5074* (2013.01); *H04L 25/063* (2013.01); *G05B 2219/25323* (2013.01); *G06Q 10/063* (2013.01); *H04W 24/10* (2013.01); *G06F 17/30389* (2013.01)
USPC ........... 700/17; 700/83; 705/14.53; 705/7.29; 375/326; 375/329; 375/340; 342/58; 709/223; 709/224

(58) Field of Classification Search
None
See application file for complete search history.

(56) References Cited

U.S. PATENT DOCUMENTS

| | | | |
|---|---|---|---|
| 7,617,270 B2 * | 11/2009 | Nikitin ......................... 708/801 |
| 7,689,919 B2 * | 3/2010 | Abbott et al. ................. 715/740 |
| 7,730,494 B1 * | 6/2010 | Rosenbluth et al. .......... 719/318 |
| 7,797,409 B1 * | 9/2010 | Secer ............................ 709/223 |
| 7,945,490 B2 * | 5/2011 | Alonzo et al. ................. 705/30 |
| 2003/0046138 A1 * | 3/2003 | Cary et al. ..................... 705/10 |
| 2004/0186798 A1 * | 9/2004 | Blitch et al. ................... 705/29 |
| 2004/0230507 A1 * | 11/2004 | Davidovitch et al. .......... 705/35 |
| 2005/0031103 A1 * | 2/2005 | Gunderman, Jr. ....... 379/114.03 |
| 2006/0129415 A1 * | 6/2006 | Thukral et al. ................... 705/1 |
| 2006/0179469 A1 * | 8/2006 | Fransman et al. ............ 725/115 |
| 2007/0053513 A1 * | 3/2007 | Hoffberg ....................... 380/201 |
| 2007/0067175 A1 * | 3/2007 | Fulgham et al. .................. 705/1 |
| 2007/0133780 A1 * | 6/2007 | Berner et al. ............. 379/265.01 |
| 2007/0244777 A1 * | 10/2007 | Torre et al. ....................... 705/35 |
| 2008/0047018 A1 * | 2/2008 | Baudoin et al. ................. 726/25 |
| 2008/0162678 A1 * | 7/2008 | Wang et al. ................... 709/223 |
| 2008/0208897 A1 * | 8/2008 | Lew et al. ................. 707/103 R |
| 2008/0243646 A1 * | 10/2008 | Stein et al. ....................... 705/28 |
| 2009/0063310 A1 * | 3/2009 | Alonzo et al. ................... 705/30 |
| 2009/0161549 A1 * | 6/2009 | Qian et al. .................... 370/241 |

OTHER PUBLICATIONS

Lehikoinen, Juha, et al. "MEX: a distributed software architecture for wearable computers." Wearable Computers, 1999. Digest of Papers. The Third International Symposium on. IEEE, 1999.*

(Continued)

*Primary Examiner* — Gurkanwaljit Singh (57) ABSTRACT

An approach for automatically generating system asset inventory discrepancies and matches and for identifying system asset accuracy information based on comparison of asset data in subsystems thereof, and for providing a list of actual assets based on comparison of trouble ticket information and a cumulative matching data set.

17 Claims, 7 Drawing Sheets

(56) References Cited

OTHER PUBLICATIONS

Leonhardi, Alexander, et al. "Virtual information towers—a metaphor for intuitive, location-aware information access in a mobile environment." Wearable Computers, 1999. Digest of Papers. The Third International Symposium on. IEEE, 1999.*

Grossmann, Matthias, et al. "Efficiently managing context information for large-scale scenarios." Pervasive Computing and Communications, 2005. PerCom 2005. Third IEEE International Conference on. IEEE, 2005.*

Spreitzer, Mike, and Marvin Theimer. "Architectural considerations for scalable, secure, mobile computing with location information." Distributed Computing Systems, 1994., Proceedings of the 14th International Conference on. IEEE, 1994.*

Leonhardt, Ulf, and Jeff Magee. "Security considerations for a distributed location service." Journal of Network and Systems Management 6.1 (1998): 51-70.*

Leonhardt, Ulf, and Jeff Magee. "Towards a general location service for mobile environments." Services in Distributed and Networked Environments, 1996., Proceedings of Third International Workshop on. IEEE, 1996.*

* cited by examiner

METHOD AND SYSTEM FOR ACCURATELY DETERMINING SERVICE PROVIDER ASSETS

BACKGROUND INFORMATION

Modern communication systems involve a delicate interplay of network components that support voice and data services. These systems are vital to business operations, such that downtime imposes a significant cost to the business. The impact of network failures (even very minor ones lasting only minutes) can be measured in thousands or even millions of dollars. Therefore, when problems arise with such systems and repairs are required, it is highly desirable that accurate information be available to telecom service providers to identify, track and update available inventory, for maintenance, repair or updating of particular systems in a timely manner. Because networks tend to develop and evolve independently (particularly with respect to voice service and data service), the coordination among the systems that support these services are lacking. The consequence is an inaccurate accounting of the inventory of the network assets, thereby resulting in operational inefficiency.

Based on the foregoing, there is a need for an automated asset inventory accuracy identification method and system that can determine inaccurate and inconsistent asset information maintained in different systems of a service provider.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for identifying and improving accuracy and consistency of network asset inventory, such as maintained by a telecommunications service provider for example, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to tracking asset inventory in a service provider's network and to verification whether the network is built as designed, it is contemplated that these embodiments have applicability to systems operated by different organizations and to other operations wherein asset inventory information may be maintained in separate subsystems.

Figure 1A:
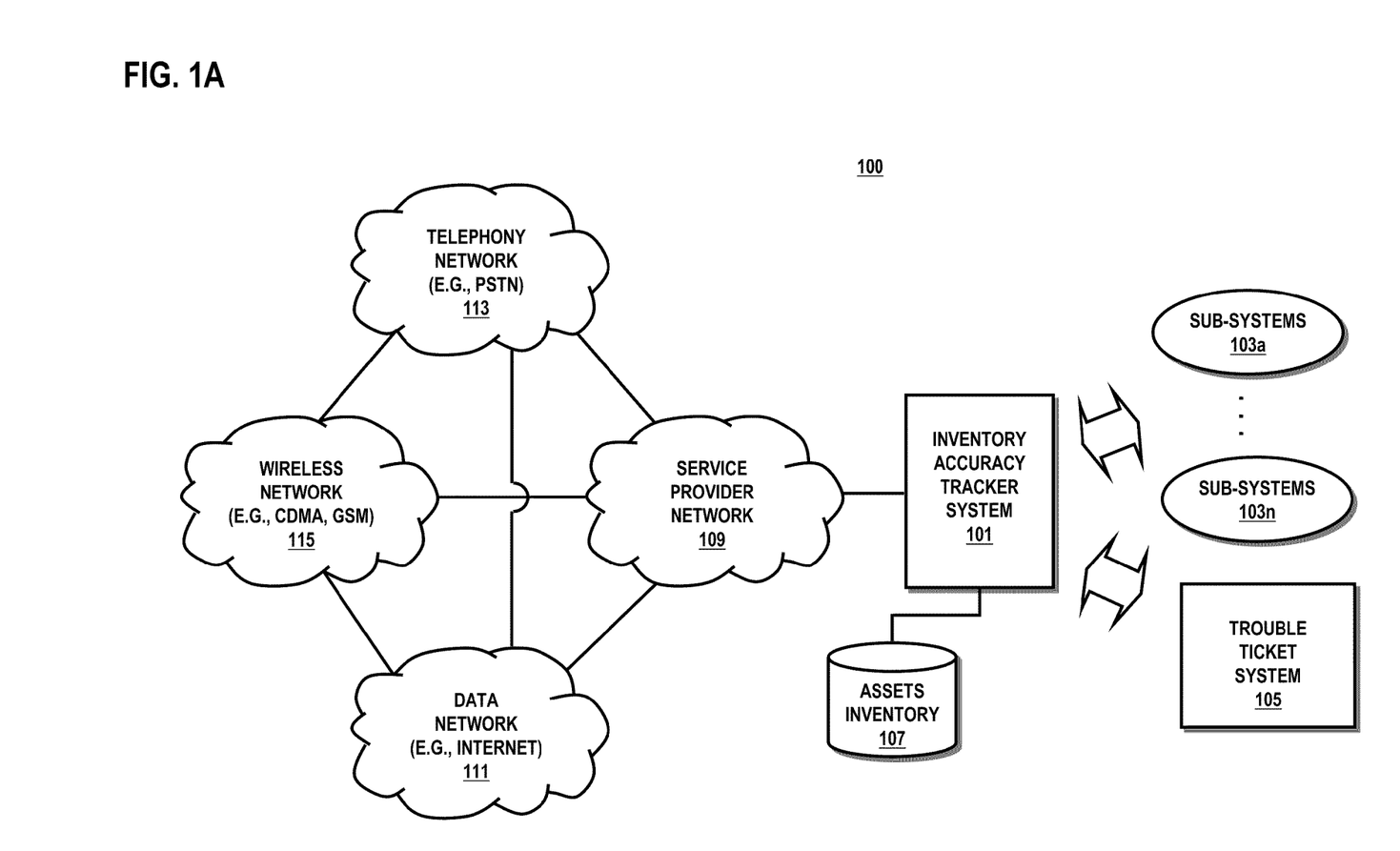
FIGS. 1A and 1B are diagrams of a system capable of providing accurate inventory tracking of network assets, according to one embodiment.
Figure 1B:
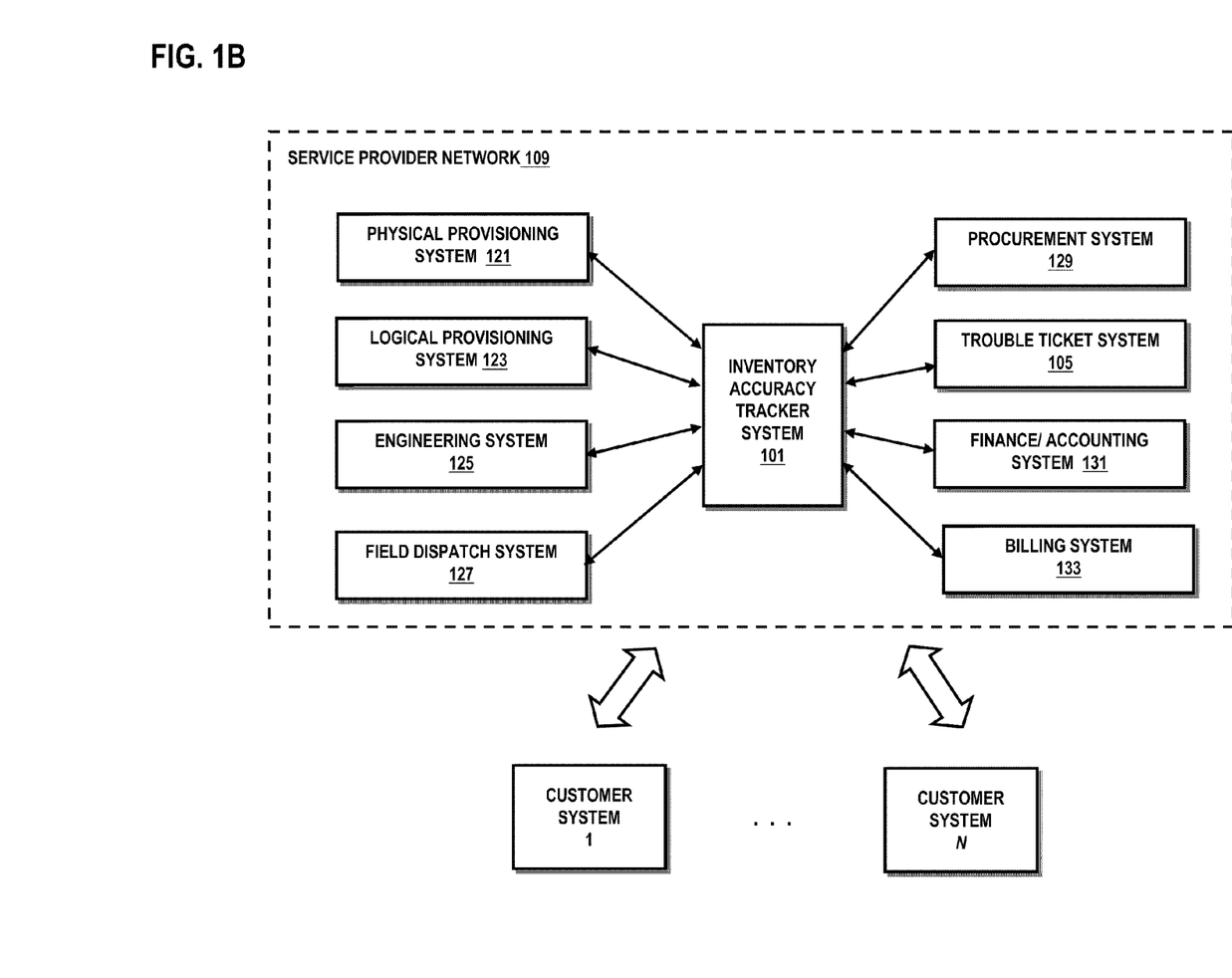

FIGS. 1A and 1B are diagrams of a system capable of providing accurate inventory tracking of network assets, according to one embodiment. Service providers and other businesses may utilize several approaches to obtain accurate inventory information. Although a single comprehensive view of inventory may be one solution to accurately track the inventory, because of practical concerns various operators maintain different systems to maintain and manage data regarding engineering, financial and provisioning services corresponding to these respective departments. For example, previously developed (or legacy) engineering, provisioning, and financial systems, etc., may be in operation with newly developed systems, and thus, may be maintained independently. Moreover, service providers and the associated networks that such providers maintain may utilize trouble ticket systems as an efficient manner in which to keep track of problem events that arise in the system, and to keep track of the steps being taken to resolve such problems. However, inventory information stored in such different systems could become inaccurate and inconsistent. Such inaccuracy might arise as a result of various factors, such as a mismatch between data in the field and the data stored in the systems, missing physical network information, etc.

The approach of system 100 stems, in part, from the recognition that inventory tracking continues to be problematic for service provider to ensure accurate accounting of their assets. As shown, system 100 includes an inventory accuracy tracker system 101 that interacts with a multitude of sub-systems (or data systems) 103a-103n to collect inventory data retrieving data relating to assets that is owned and/or managed by the service provider. Among these sub-systems 103a-103n is a trouble ticket system 105. It is noted that trouble ticket information may be used together with various inventory data and discrepancies to identify existence of problems in various assets as well as to predict future asset requirements. According to one embodiment, the inventory accuracy tracker system 101 determines an accuracy level of the inventory data collected from the sub-systems 103a-103n by comparing the data corresponding to one of the data systems 103a-103n with data corresponding to another one of the data systems 103a-103n to output a matching data set. The inventory accuracy tracker system 101 iteratively determines these accuracy levels by comparing the matching data set with data corresponding to a subsequent one of the data systems 103a-103n until a cumulative matching data set is generated using all of the data of the data systems 103a-103n. Thereafter, the inventory accuracy tracker system 101 retrieves trouble ticket information from the trouble ticket system 105, and generates a list of actual assets based on the trouble ticket information and the cumulative matching data set. The list can be stored in an assets inventory database 107.

For illustrative purposes, the inventory accuracy tracker system 101 is implemented as part of a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

Given the numerous technologies and components involved with the above networks, it is not surprising that current inventory tracking approaches are inadequate.

As seen in FIG. 1B, the subsystems 103a of a service provider (e.g., of telecommunication services) can include systems, such as a physical provisioning system 121, a logical provisioning system 123, an engineering system 125, a field dispatch system 127, a procurement system 129, a trouble ticket system 105, a finance/accounting system 131, and a billing system 133. Provisioning, per the provisioning systems 121 and 123, focuses on using available capacity to provide services, and includes network configuration, capacity activation, service assignment, installation, and/or testing. This provisioning function can also address end-to-end connectivity, and assigning equipment, paths, circuit identifiers, network addresses (e.g., Internet Protocol (IP) addresses), and customer numbers.

The engineering system 125 can support the functions of the engineering group. For example, the engineering group has responsibility for conduit runs, buildings, equipments, equipment bays, optical fibers within underground ducts, telephone poles, radio base stations, etc. With respect to these assets, the engineering group is also concerned with engineering limitations, environmental factors, and geospatial horizontal and vertical coordinates of equipment. Accordingly, engineering system 125 can track and store data relating to these equipments and concerns.

The field dispatch system 127 operates in conjunction with the trouble ticket system 105 to coordinate the dispatch of technicians to address outages and equipment failure, for example, as well as the provisioning systems 121 and 123 to perform any necessary installations. In particular, dispatch system 127 may monitor and control allocation of workforce to perform various tasks needed to provide customers with various services, such as set-up and maintenance of customer's services.

In addition, a procurement system 129 can be utilized by the service provider to coordinate with other service providers and/or equipment manufacturers to acquire assets. Finance/accounting system 131 provides financial planning and analysis support of the network and services. Furthermore, the finance/accounting system 131 is involved in asset management, for example, to the extent that monies relating to the procurement of equipment and services need to be accurately accounted for and suppliers need to be paid. Billing system 133 provides invoicing capability for the services and/or products provided by the service provider network 109 to customers. For instance, billing system 133 performs the following activities: account activation and tracking, service feature selection, selection of billing rates for specific calls, invoice creation, payment entry and management of communication with the customers.

It is recognized that one or more of these systems 121-133133 and 105 can be utilized, as well as additional systems, depending on the particular requirements of the service provider. Furthermore, the functionality of the sub-systems may vary with the service provider.

By way of example, telecommunications services of the service provider network 109 may provide media content or communication services (e.g., voice, data, video, etc.) to various customers (or subscribers) via customer system$_1$ . . . customer system$_N$. The customers can be individuals (or residences) that receive one or more media services from the service provider network 109, either directly or from a content provider via the service provider network 109. The customer could also be an entity, such as a corporation, enterprise, or organization, that receives one or more media services from the service provider network 109, either directly or from a content provider or via the service provider network 109. The various communication conduits used to provide one or more media services to the various customers are not expressly depicted in FIG. 1, and can include the use of any form of wired or wireless communication architecture (e.g., land-line, cable, fiber optic, satellite-based, cellular, or other communication architecture).

The physical provisioning system 121, according to one embodiment, monitors and controls the provisioning of various network resources to particular customers, such as by designing physical circuits that need to be placed in the field. Physical provisioning system 121 stores information about the circuits and their design, about various network elements, customers using the circuits, circuit bandwidth and the like. The logical provisioning system 123 can address OSI (Open System Interconnection) Layer 2/3 provisioning. As such, system 123 assigns and activates logical ports, assigns Internet Protocol (IP) ranges and addresses, and the like.

In order to process various customer problems and concerns that arise with a customer's services, the service provider network 109 includes a trouble ticket system 105. The trouble ticket system 105 allows for the creation of a trouble ticket for a customer problem, which can be used to track the steps being taken to resolve the problem. Trouble ticket system 105 is thus used to capture problems that could arise when using the network, such as may be identified by consumer complaints, to keep track of various problem events that arise in the system, and to keep track of the steps being taken to resolve such problems.

Figure 2:
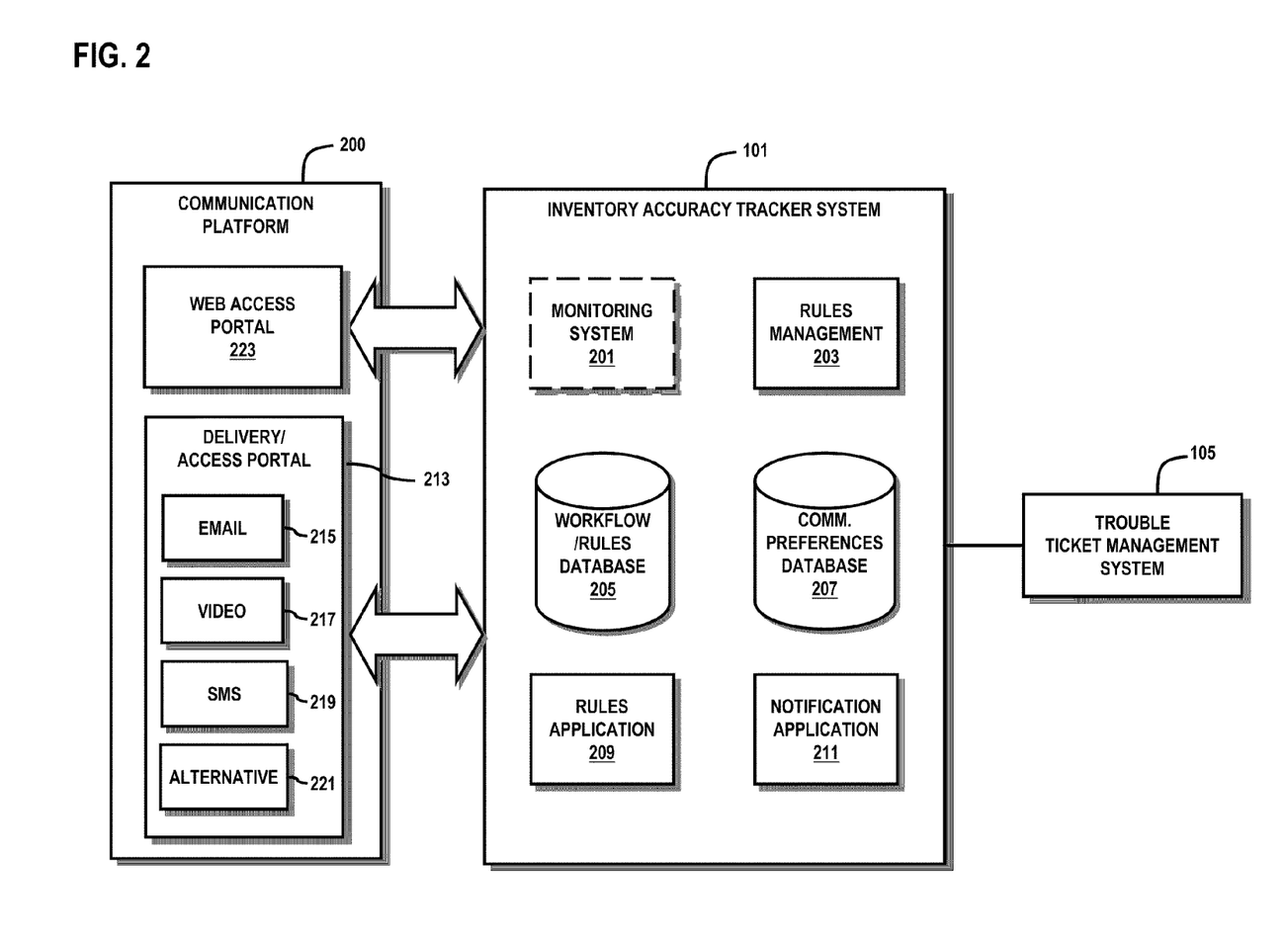
FIG. 2 is a diagram of an inventory accuracy tracking system and communication platform for use with a service provider network for providing automated inventory discrepancy status notification, according to various embodiments.

FIG. 2 is a diagram of an embodiment of the inventory accuracy tracker system 101 and a communication platform 200 used with an exemplary one of various subsystem of a service provider network for identifying inaccuracies in asset inventory data maintained therein. The inventory accuracy tracker system 101 includes a monitoring system 201, which can either be integrated as part of the system 101 or may be a separate unit therefrom, a rules management module 203, a workflow/rules database 205, a communications preferences database 207, a rules application module 209, and a notification application module 211. The monitoring system 201 is used to monitor events or test results that occur in application of the inventory accuracy tracker system 101 to one or more of the subsystems 121-133 and 105 for analysis by inventory accuracy tracker system 101. According to one embodiment, the monitoring system 201 can be configured, e.g., by a system administrator, to when the monitoring process is executed.

The rules management module 203 allows creation, definition, modification, and deletion of rules and workflows that determine when an event occurring in the subsystem of the network that is detected by the inventory accuracy tracker system 101 triggers a discrepancy, or similar inventory status update, being searched for by the tracker system 101. The workflow/rules database 205 stores the various workflows and rules. Engineers, for example, can identify exactly what has to happen to trigger the new discrepancy (e.g., discrepancies can only be triggered by certain subsystems, or by particular deviations between subsystems), and/or there can be exceptions built into the system, for example, conditional logic can be applied to the new trigger.

The communication preferences database 207 stores preference information regarding the manner in which discrepancy update information is to be transmitted, for example, the portal via which such updates should be transmitted, received or accessed (e.g., via email, video, short message service (SMS), web, etc.), contact information for communicating the update information to or from any system or subsystem, the frequency of updates (e.g., on a periodic basis at a certain interval, on an event basis, etc.).

The rules application module 209 receives the event updates detected by the monitoring system 201 and applies the triggering criteria from the workflow/rules database 205 to determine if a discrepancy update has been triggered. The notification application module 211 receives the triggered discrepancy summary updates determined by the rules application module 209 and determines if and in what manner a discrepancy or status summary update should be communicated or made available for correction of inventory data.

The communication platform 200 is provided to allow for automated status summary messages to be sent. Such messages can be presented either as a one way communication, or in an interactive manner so that a receiving system is given an ability to communicate further information to inventory accuracy tracker system 101 and/or to request and retrieve additional information (e.g., using web links, or telephone menus, email addresses, etc.).

The communication platform 200 includes a delivery/access portal 213 having an email portal 215, a video portal 217, an SMS portal 219 an alternative portal 221 for using any alternative manner of communication. The communication platform 200 also includes a web access portal 223. The communication platform 200 allows inventory accuracy tracker system 101 to automatically send inventory discrepancy and status summary updates as required, and/or permits proactive access and retrieval of such inventory discrepancy and status summary updates via such automated portals (e.g., web sites) 213, 223 as may be desired. For example, upon updating of the status summary, the notification application 211 could direct a web communication to a web address for another of subsystems 121-133 and 105 to obtain further information relating to a detected asset discrepancy, or to obtain historical data relating to the discrepancy status, etc.

As will be appreciated from the process described in the following description, the system illustrated in the accompanying figures is capable of calculating accuracy levels by comparing asset data differences between various subsystems. For example, inventory accuracy tracker system 101 may review and compare asset data present in procurement system 129 and in finance/accounting system 131. An accuracy level may be determined by considering the matches and discrepancies between the data of the two systems. The matching data resulting from this first comparison are identified as, for example, Set A.

The system then calculates the accuracy level between Set A and the data of engineering system 125 by comparing the data of Set A with the data in the engineering system. As a result of this comparison the network inventory accuracy tracking system knows whether finance/accounting system 131 has all the asset information about the network and vice versa. Accuracy level is again calculated by considering the matches and discrepancies between the two, and the matching data of this comparison are identified as Set B.

The accuracy level between the data of Set B and physical provisioning system 121 is determined by a comparison of the data of set B with the data in the physical provisioning system. As a result of this comparison the inventory accuracy tracker system 101 knows whether the physical provisioning system has all the information about the available network elements assets and whether both of the systems are in synchronization. Again, the accuracy level is calculated by considering the matches and discrepancies between the two sets of data. The matching data of this comparison are called data Set C.

The accuracy level between Set C and billing system 133 is determined by a comparison of the data of set C with the data in the billing system 133. As a result of this comparison the inventory accuracy tracker system 101 is notified of whether the billing system 133 has all the billing information about the available ports, channels, network elements and other assets and whether both of the systems are synchronized. Once again, the accuracy level is calculated by considering the matches and discrepancies between the two sets of data. The matching data of this comparison are identified as Set C.

The accuracy level between Set C and field dispatch system 127 is determined by a comparison of the data of set C with the data in the field dispatch system. As a result of this comparison the inventory accuracy tracker system 101 knows whether both of these systems are in sync. Once again, the accuracy level is calculated by considering the matches and discrepancies between the comparisons. The matching data of this comparison are identified as Set E.

Inventory accuracy tracker system 101 then compares the trouble tickets data maintained by trouble ticket system 105 with the discrepancies found in the above described steps. By implementing such comparisons, inventory accuracy tracker system 101 will have isolated the defect if it is caused by network inaccuracy or inconsistency.

Figure 3A:
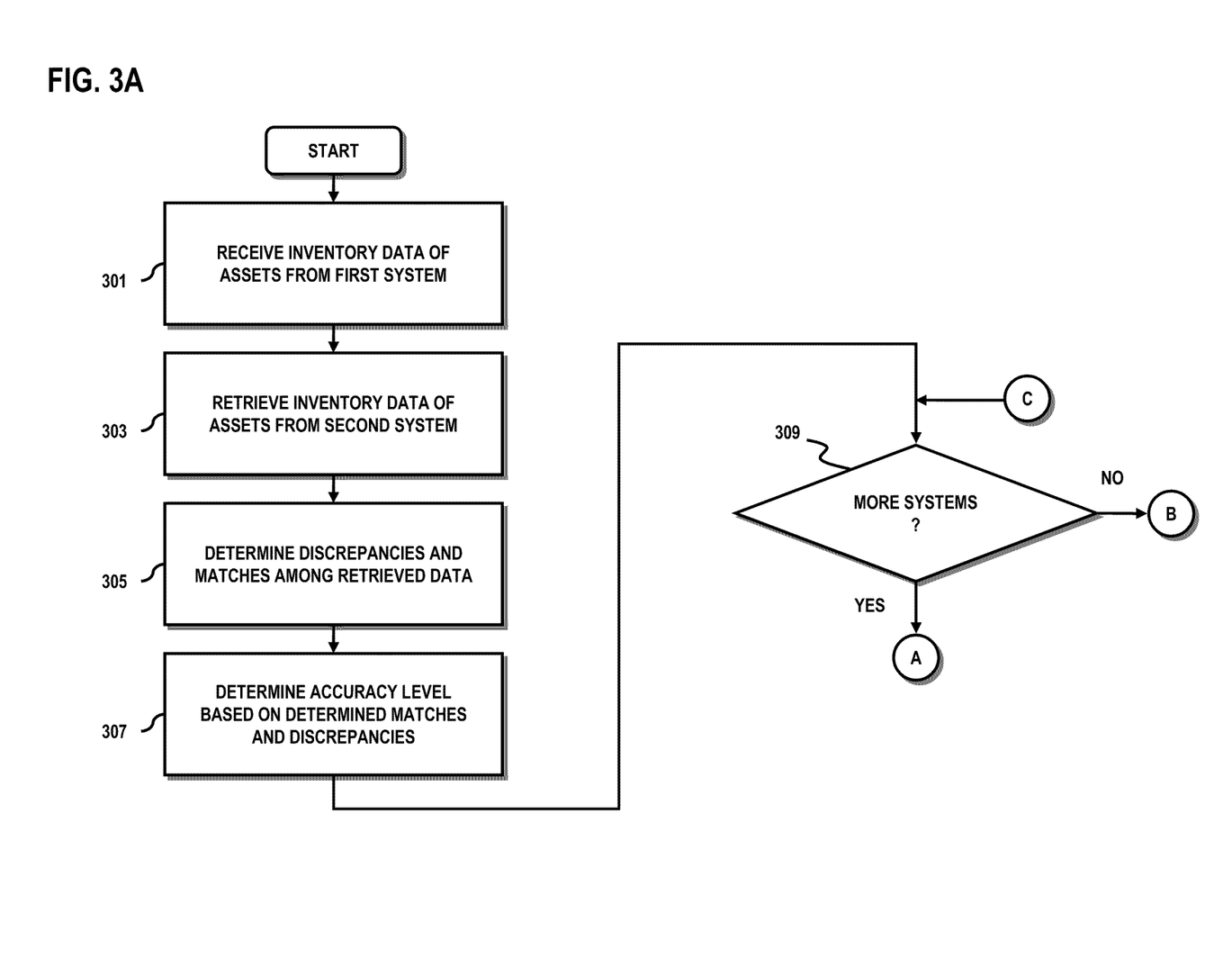
FIG. 3A is a flowchart of a network asset inventory accuracy determination process for a particular subsystem thereof, according to various embodiments.

FIG. 3A is a flowchart of an asset inventory discrepancy status update summary process described above which may be carried out by an embodiment illustrated in FIG. 2, for example, to identify an inaccuracy of asset inventory information. In step 301, the monitoring system 201 receives asset inventory data from a first subsystem of service provider network 109, such as one of systems 121-133 and 105 shown in FIG. 1, e.g. procurement system 129, and in step 303 the monitoring system 201 retrieves asset inventory data from a second subsystem of service provider network 109, such as another of systems 121-133 and 105, e.g. finance/accounting system 131. At step 305 the data from the two systems are compared to identify discrepancies and matches among the retrieved data. Such a determination may be made for a particular purchase order, for example, with the aid of a datafile identified as "Asset Master" in which data relating to each asset are stored with a unique identifier, which may include data from a purchase order, classification of the asset, name of the asset, model number, version number, vendor identification, etc. The determination of step 305 may be made, for example, by implementing the following sequence of steps with the aid of several counter values identified as Purchase Order Match, Purchase Order Discrepancy, Purchase Order Asset Value, Purchase Order Discrepancy Value and Purchase Order Match Value. Table 1 shows an exemplary process:

TABLE 1

SET Purchase_Order_Match_count to ZERO.
SET Purchase_Order_DISCREPANCY_COUNT to ZERO
SET Purchase_Order_ASSET_VALUE to ZERO
SET Purchase_Order_DISCREPANCY_ASSET_VALUE to ZERO
For each item in the Asset Master of a Purchase Order :
Check whether that particular item is present in the inventory of the
    Engineering System.
If the inventories of Asset Master & Engineering system match,
    then SET the flag in the Asset Master that conveys whether the Asset
        Master's inventory item is in sync with that of Engineering System to
        be TRUE. Similarly the flag in the Engineering System. Increment
        the Purchase_Order_Match_count by 1.
    Also increment Purchase_Order_ASSET_VALUE by the Items ASSET
        VALUE.
If the inventories of Asset Master & Engineering system don't match,
    then SET the flag in the Asset Master that conveys whether the Asser
        Master's inventory item is in sync with that of Engineering System to
        be FALSE. Similarly the flag in the Engineering System. Increment
        the Purchase_Order_DISCREPANCY_count count by 1.
    Increment Purchase_Order_DISCREPANCY_ASSET_VALUE by the
        items ASSET VALUE. Also maintain a TABLE to hold the
        DISCREPANCY inventories.

Having thus identified a number of discrepancies and matches, the system 101 identifies whether the entire purchase order is missing or, if not, how many of the assets ordered for purchase are actually found in inventory (match count). This determination may be made by implementing the following sequence of steps, shown in Table 2:

TABLE 2

If Purchase_Order_DISCREPANCY_count is equal to the number of
    items in the Asset Master for that particular Purchase Order,
    then the inventory regarding the entire Purchase Order is absent
        in the Engineering System.

TABLE 2-continued

Update INVENTORY_ALARM table to hold the details the entire
    purchase order which could be verified by the AUDITORS.
INCREMENT TOTAL_ASSET_MATCH_COUNT by
    Purchase_Order_Match_count.
INCREMENT TOTAL_DISCREPANCY_ASSET_COUNT by
    Purchase_Order_DISCREPANCY_count
Increment TOTAL_ASSET_MATCH_VALUE by
    Purchase_Order_ASSET_VALUE.
Increment TOTAL_ASSET_DISCREPANCY_VALUE by
    Purchase_Order_DISCREPANCY_ASSET_VALUE.

Similarly, by repeating similar steps discrepancies may be identified between data describing asset inventory found in the field and assets identified in the Asset Master datafile, thus identifying the discrepancy count and the value of assets missing from the Asset Master datafile. After the foregoing, the available data includes: (a) the list of inventory that are present in ASSET MASTER but that are not in ENGINEERING SYSTEM, (b) TOTAL_ASSET_COUNT, (c) TOTAL_DISCREPANCY_ASSET_COUNT, (d) TOTAL_ASSET_VALUE and (e) TOTAL_ASSET_DISCREPANCY_VALUE By repeating the foregoing and checking the asset inventory present in an Engineering System with that of a Physical Provisioning System, network usage accuracy may be identified as (Number of inventory available in the Physical Provisioning System)*100/(Number of inventory available in the Engineering System).

At step 307 the system may thus determine the total network accuracy level by implementing a step such as the process of Table 3.

TABLE 3

Network Accuracy = (TOTAL_ASSET_MATCH_COUNT)/
    (TOTAL_ASSET_MATCH_COUNT +
    TOTAL_DISCREPANCY_ASSET_COUNT) * 100

Upon implementation of this step, the process is at point C of FIG. 3A. At step 309 the inventory accuracy tracker system 101 determines whether or not an additional subsystem of the network is to be considered in determining the asset inaccuracies and matches, as well as the network accuracy of usage of its identified assets, and proceeds accordingly to the sequences illustrated at FIGS. 3B and 3C.

Figure 3B:
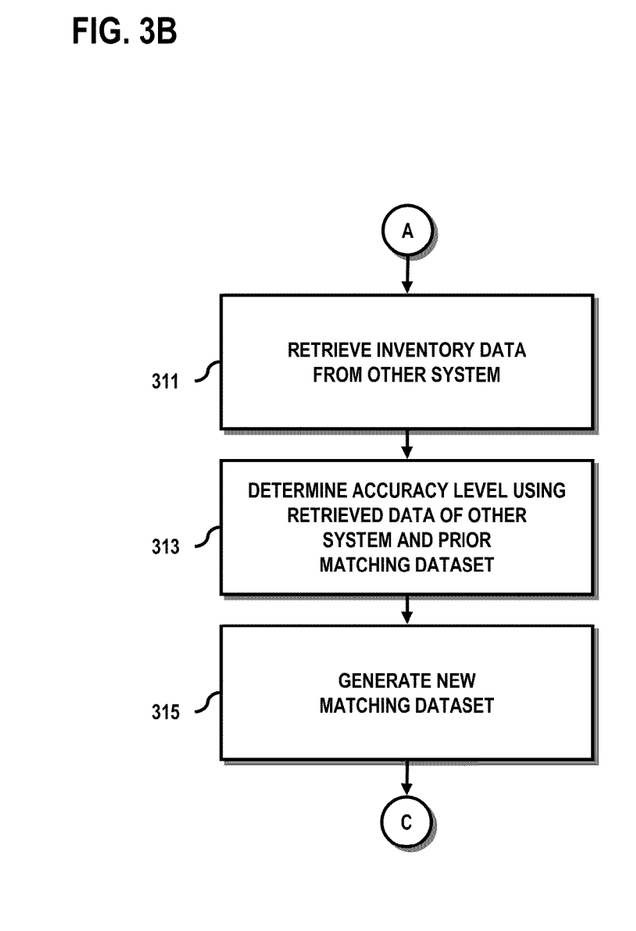
FIG. 3B is a flowchart of a process for updating network asset inventory accuracy determination by consideration of an additional subsystem, according to various embodiments.

If an additional subsystem remains for consideration, processing continues to step 311 of FIG. 3B, where asset data are retrieved from the additional subsystem. At step 313 additional discrepancies are identified in the manner previously described, the prior matching dataset is updated to create a new match dataset, and asset inventory accuracy recalculated, with updating and recalculation of the matching dataset indicated at step 315. Processing then returns to point C of FIG. 3A.

Figure 3C:
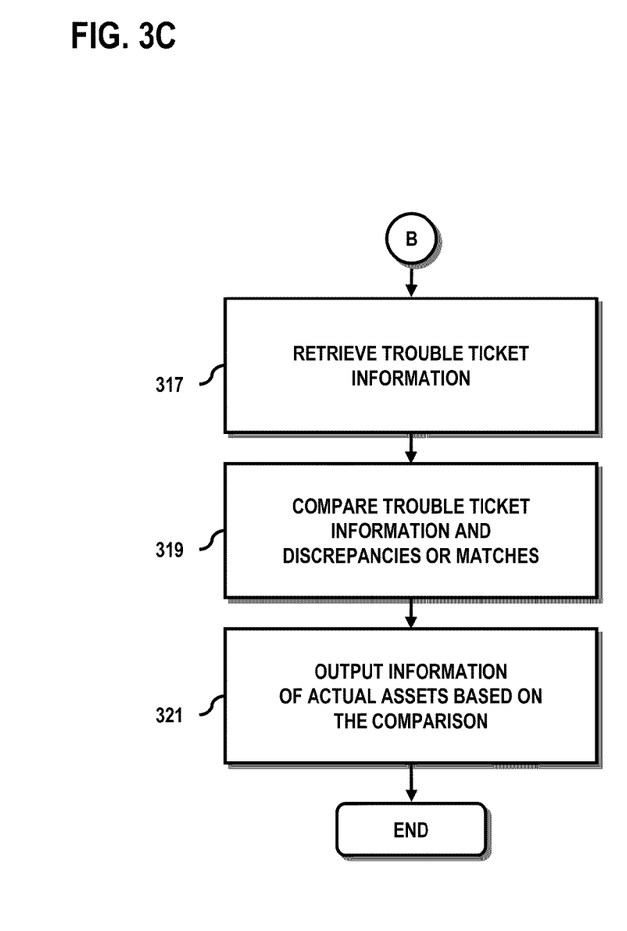
FIG. 3C is a flowchart of a process for comparing asset inventory discrepancies with trouble ticket information, according to one embodiment.

When no additional subsystems remain for consideration, processing proceeds from step 309 of FIG. 3A to point B, and thence to step 317 at FIG. 3C, in order to identify specific assets which may exist in the system, or which may be defective within the system. As illustrated therein, inventory accuracy tracker system 101 accesses trouble ticket information from the trouble ticket system 105. Such information may be used to identify the presence of a specific asset in the system if, in fact, a trouble ticket had been initiated relative to functioning of that asset. Similarly, where several trouble tickets refer to malfunction of the same asset at different locations or in different systems, valuable information may be obtained as to quality of the asset, failure rate of the asset, failure of a vendor to deliver or properly install the asset, etc.

Accordingly, a comparison of trouble ticket information with discrepancy information may be used to identify situations in which assets are in fact present, but associated with a discrepancy due to failure. On the other hand, a comparison of trouble ticket information with an asset matching data set may be used as a basis for identifying potential impending asset failures. In either case, at step 319 a comparison is made between the trouble ticket information obtained from trouble ticket system 105 and discrepancies and matches. Based on such a comparison, at step 321 the inventory accuracy tracker system 101 outputs information relative to actual assets of the system. Such information may be in the form of a list, a statistical analysis, or other useful format.

Figure 4:
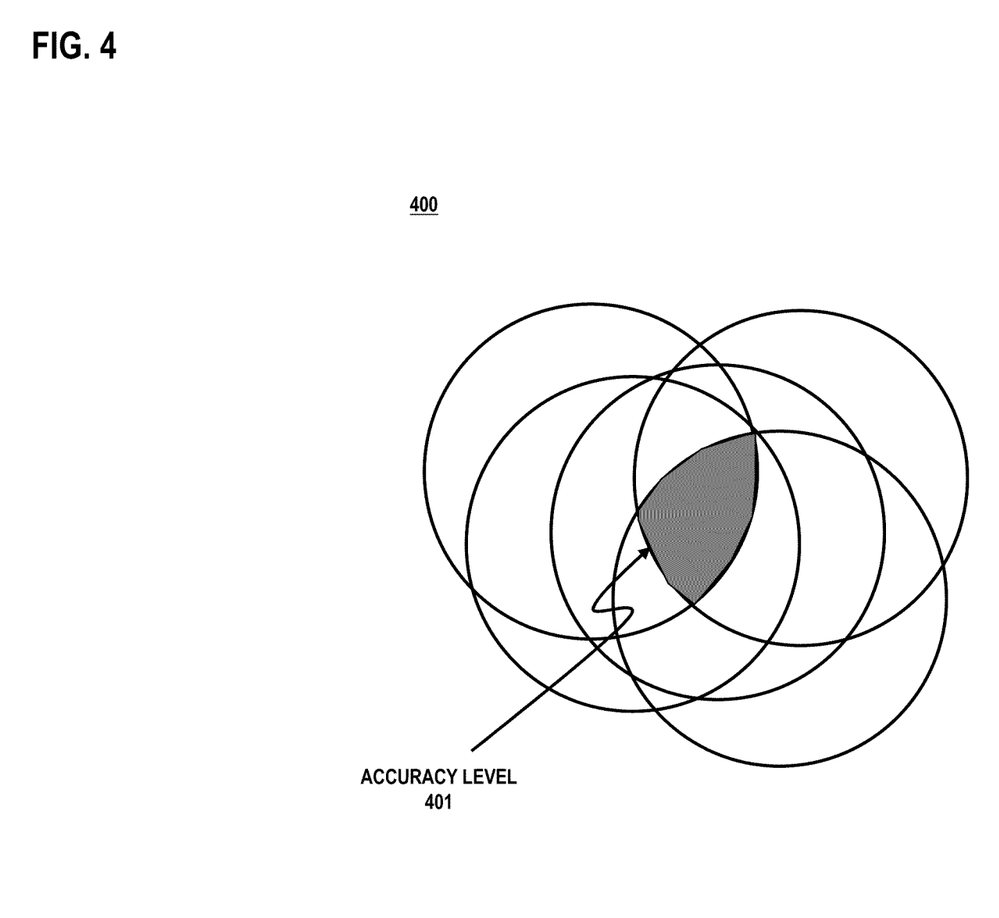
FIG. 4 is a Venn diagram illustrating the intersection of data across the various sub-systems of FIG. 1, according to one embodiment.

FIG. 4 is a Venn diagram illustrating the intersection of data across the various sub-systems of FIG. 1, according to one embodiment. Venn diagram 400 depicts the cross-section of data maintained by, for example, five of the sub-systems 121-133. Section 401 represents the accuracy level resulting from the comparison of data according to the processes of FIGS. 3A-3C. It is noted that a higher level of accuracy can be generally be obtained by involving more of the sub-systems 121-133 (i.e., greater than 5).

The processes described herein for providing asset inventory information may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
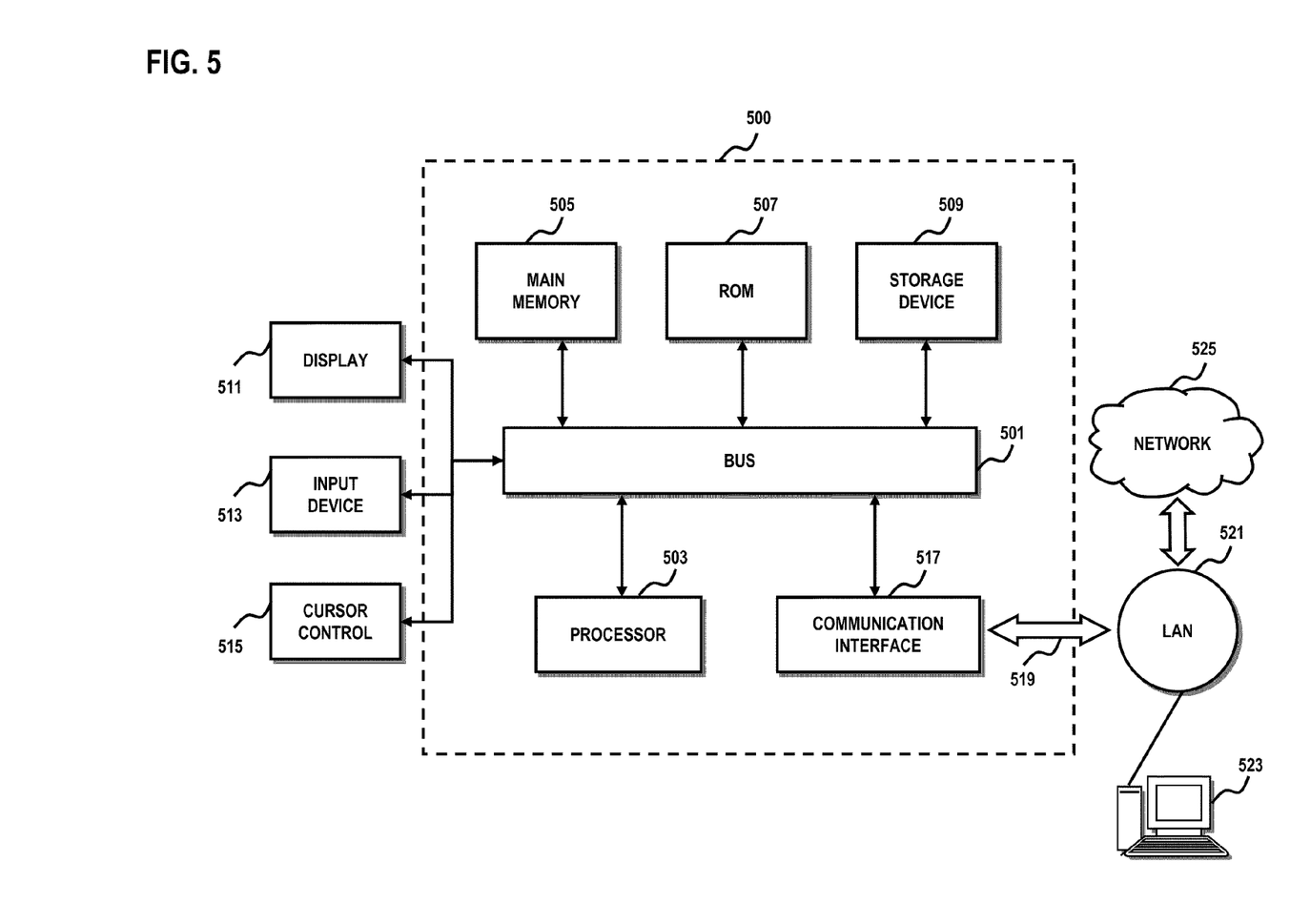
FIG. 5 is a diagram of a computer system that can be used to implement various exemplary embodiments.

FIG. 5 illustrates computing hardware (e.g., computer system) 500 upon which an embodiment according to the invention can be implemented. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    retrieving, from one or more storage devices, data relating to a plurality of assets of a service provider from a plurality of data systems associated with the service provider, wherein the data systems include a trouble ticket system;
    determining, with one or more processors, an accuracy level of the data by comparing the data corresponding to a first one of the data systems with data corresponding to a second one of the data systems to output a current matching data set;
    determining, with the one or more processors, further accuracy levels by comparing the current matching data set with data corresponding to a subsequent one of the data systems to output a new current matching data set, and iteratively continuing the determining, with the one or more processors, the further accuracy levels for data corresponding to each next subsequent one of the data systems using each new current matching data set as the current matching data set until a cumulative matching data set is generated according to the determined further accuracy levels using all of the data of the data systems;
    retrieving, from the one or more storage devices, trouble ticket information relating to the assets from the trouble ticket system; and
    generating, with the one or more processors, a list of actual assets based on the trouble ticket information and the cumulative matching data set,
    wherein each of the accuracy levels is determined by comparing corresponding data for discrepancies, the method further comprising:
    determining a cumulative discrepancy data based on the comparisons; and
    comparing the trouble ticket information with the cumulative discrepancy data to generate the list of actual assets by identifying assets that are present, but associated with a discrepancy due to failure.

2. A method according to claim 1, wherein the accuracy levels are assigned to the plurality of assets.

3. A method according to claim 1, wherein the data systems further includes either a procurement system, a physical provisioning system, a logical provisioning system, an engineering system, a field dispatch system, an accounting system, or a combination thereof.

4. A method according to claim 1, wherein the assets include physical circuits and network equipment of the service provider.

5. A method according to claim 1, wherein the data includes procurement data and financial data.

6. A method according to claim 1, wherein the assets include physical assets.

7. An apparatus comprising:
    a memory configured to store data relating to a plurality of assets of a service provider from a plurality of data systems associated with the service provider, wherein the data systems include a trouble ticket system; and
    a processor coupled to the memory and configured to determine an accuracy level of the data by comparing the data corresponding to a first one of the data systems with data corresponding to a second one of the data systems to output a current matching data set, to determine further accuracy levels by comparing the current matching data set with data corresponding to a subsequent one of the data systems to output a new current matching data set, and to iteratively continue to determine the further accuracy levels for data corresponding to each next subsequent one of the data systems using each new current matching data set as the current matching data set until a cumulative matching data set is generated according to the determined further accuracy levels using all of the data of the data systems,
    wherein the processor is further configured to initiate retrieval of trouble ticket information relating to the assets from the trouble ticket system, and to generate a list of actual assets based on the trouble ticket information and the cumulative matching data set, and
    wherein each of the accuracy levels is determined by comparing the corresponding data for discrepancies, the processor being further configured to determine a cumulative discrepancy data based on the comparisons, and to compare the trouble ticket information with the cumulative discrepancy data to generate the list of actual assets by identifying assets that are present, but associated with a discrepancy due to failure.

8. An apparatus according to claim 7, wherein the accuracy levels are assigned to the plurality of assets.

9. An apparatus according to claim 7, wherein the data systems further includes either a procurement system, a physical provisioning system, a logical provisioning system, an engineering system, a field dispatch system, an accounting system, or a combination thereof.

10. An apparatus according to claim 7, wherein the assets include physical circuits and network equipment of the service provider.

11. An apparatus according to claim 7, wherein the data includes procurement data and financial data.

12. An apparatus according to claim 7, wherein the assets include physical assets.

13. A system comprising:
one or more storage devices arranged to form a database configured to store data relating to a plurality of assets of a service provider from a plurality of data systems associated with the service provider, wherein the data systems include a trouble ticket system; and
an inventory platform, including one or more processors, and configured to communicate with the database formed by the one or more storage devices and to determine, with the one or more processors, an accuracy level of the data by comparing the data corresponding to a first one of the data systems with data corresponding to a second one of the data systems to output a current matching data set, to determine, with the one or more processors, further accuracy levels by comparing the current matching data set with data corresponding to a subsequent one of the data systems to output a new current matching data set, and to iteratively continue to determine the further accuracy levels for data corresponding to each next subsequent one of the data systems using each new current matching data set as the current matching data set until a cumulative matching data set is generated according to the determined further accuracy levels using all of the data of the data systems,
wherein the inventory platform is further configured to initiate retrieval, from the one or more storage devices, of trouble ticket information relating to the assets from the trouble ticket system, and to generate, with the one or more processors, a list of actual assets based on the trouble ticket information and the cumulative matching data set, and
wherein each of the accuracy levels is determined by comparing the corresponding data for discrepancies, the inventory platform being further configured to determine a cumulative discrepancy data based on the comparisons, and to compare the trouble ticket information with the cumulative discrepancy data to generate the list of actual assets by identifying assets that are present, but associated with a discrepancy due to failure.

14. A system according to claim 13, wherein the accuracy levels are assigned to the plurality of assets.

15. A system according to claim 13, wherein the data systems further includes either a procurement system, a physical provisioning system, a logical provisioning system, an engineering system, a field dispatch system, an accounting system, or a combination thereof.

16. A system according to claim 13, wherein the assets include physical circuits and network equipment of the service provider.

17. A system according to claim 13, wherein the data includes procurement data and financial data.

* * * * *